US011100189B2

(12) United States Patent
Basta et al.

(10) Patent No.: US 11,100,189 B2
(45) Date of Patent: *Aug. 24, 2021

(54) ADAPTIVE DETERMINATION OF DYNAMICALLY-COMPOSITED WEB ELEMENTS IN A WEB APPLICATION

(71) Applicant: Box, Inc., Redwood City, CA (US)

(72) Inventors: Matt Basta, Mountain View, CA (US); Matt Willer, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,287

(22) Filed: Jul. 15, 2019

(65) Prior Publication Data

US 2020/0012711 A1 Jan. 9, 2020

Related U.S. Application Data

(63) Continuation of application No. 14/938,773, filed on Nov. 11, 2015, now Pat. No. 10,353,992.

(51) Int. Cl.
*G06F 16/958* (2019.01)
*G06F 40/106* (2020.01)
*G06F 40/143* (2020.01)

(52) U.S. Cl.
CPC .......... *G06F 16/958* (2019.01); *G06F 40/106* (2020.01); *G06F 40/143* (2020.01)

(58) Field of Classification Search
CPC ....... G06F 16/958; G06F 40/106; G06F 40/14
See application file for complete search history.

(56) References Cited

U.S. PATENT DOCUMENTS

| 6,732,332 | B1 | 5/2004 | Borysewicz |
|---|---|---|---|
| 9,064,028 | B2 | 6/2015 | Shen |
| 2006/0020681 | A1 | 1/2006 | DePress |
| 2009/0249188 | A1 | 10/2009 | Dube |
| 2011/0041052 | A1 | 2/2011 | Fraisl |
| 2012/0066585 | A1 | 3/2012 | Caceres |

(Continued)

OTHER PUBLICATIONS

Anthony, "Why Modal Windows Have Killed Popup Windows", URL: http://uxmovement.com/forms/why-modal-windows-have-killed-popup-windows/, Mar. 19, 2011, accessed on Aug. 5, 2015.

(Continued)

*Primary Examiner* — Thomas J Dailey
(74) *Attorney, Agent, or Firm* — Vista IP Law Group, LLP

(57) ABSTRACT

Systems for user interface composition in a collaboration environment. A method commences upon identifying a server in a cloud-based environment, wherein the server is interfaced with one or more storage devices that store one or more objects accessible by two or more users. Upon receiving a request to access an object that is stored in the cloud-based environment, the method processes the request to determine if the object has two or more rendering options such as a popup rendering option or a modal rendering option. If so, the method selects one of the rendering options and collects further information such a user profile information and/or a collaboration rulebase, which further information is used to drive composition of formatted object. The adaptively-formatted object is transferred over the network to satisfy the request.

24 Claims, 13 Drawing Sheets

(56) References Cited

U.S. PATENT DOCUMENTS

| | | | |
|---|---|---|---|
| 2012/0079369 A1* | 3/2012 | Harris | H04L 67/04 |
| | | | 715/239 |
| 2013/0254855 A1 | 9/2013 | Walters | |
| 2014/0250369 A1 | 9/2014 | Mitnick | |
| 2015/0095840 A1* | 4/2015 | Soshin | G06F 3/0481 |
| | | | 715/781 |
| 2015/0227533 A1 | 8/2015 | Goldstein | |
| 2016/0259509 A1 | 9/2016 | Alexander | |

OTHER PUBLICATIONS

Notice of Allowance dated Feb. 25, 2019 for U.S. Appl. No. 14/938,773.
Final Office Action dated Aug. 24, 2018 for U.S. Appl. No. 14/938,773.
Non-Final Office Action dated Jan. 26, 2018 for U.S. Appl. No. 14/938,773.
Advisory Action dated Nov. 9, 2018 for U.S. Appl. No. 14/938,773.

* cited by examiner

ADAPTIVE DETERMINATION OF DYNAMICALLY-COMPOSITED WEB ELEMENTS IN A WEB APPLICATION

CROSS-REFERENCE TO RELATED APPLICATION(S)

This present application is a continuation of U.S. application Ser. No. 14/938,773 filed on Nov. 11, 2015, now issued as U.S. Pat. No. 10,353,992, which is hereby incorporated by reference in its entirety.

FIELD

This disclosure relates to user interface constructions collaboration, and more particularly to techniques for adaptive determination of dynamically-composited web elements using a collaboration rulebase.

BACKGROUND

Web page designers pay a great deal of attention to the look-and-feel and user interaction with web pages. Graphical user interface elements such as text areas, images, tables, lists, radio buttons, carousels, etc., are considered deeply with respect to their placement, size, juxtaposition to other elements of the page, operation, and so on. Web designers consider the information to be presented (or collected) and then make a determination as to how to present (or collect) the information. For example, a web-based form or interview process might be advantageously presented to a user as a web page that includes a pop-up window from which the user can copy/paste as needed during the course of the interview. In other situations a web page and a modal might be preferred by the web designer, for example, when the modal is provided merely as an enlargement (e.g., of a thumbnail or small photo) or when the modal is informational so as to aid the user to select from a small set of choices (e.g., as in a radio button widget). In still other cases the web designer might choose to present two web pages (e.g., each with a scrollable region).

Unfortunately, there are situations where the web designer does not have access to enough dispositive information (e.g., user behaviors, flow or navigation paths, etc.) at the time the web interface is being developed. Indeed it can happen that the web designer cannot know in advance which of a variety of page/pop-up/modal combinations would be most advantageous for the user at the time that the user is interacting with the user interface (UI). To ameliorate this dearth of user interface design information, what is needed is a technique or techniques to adaptively layout or composite the web page or pages (or popup or modal) on the basis of information that is received or determined right at the time of rendering. The situation is exacerbated when multiple collaborators access the same web application. When two or more users interact with the same web application, they might want to see the same rendering of the same pages, regardless of their general preferences. In such a case, the determination of how to adaptively layout or composite the web page or pages (or popup or modal) should be consistent among the collaborating users. Unfortunately, legacy techniques fail to consider aspects of collaboration between multiple users. What is needed is a technique or techniques to improve over legacy approaches.

SUMMARY

The present disclosure provides a detailed description of techniques used in systems, methods, and in computer program products for adaptive determination of dynamically-composited web elements using a collaboration rulebase.

The present disclosure provides systems, methods, and computer program products suited to address the aforementioned issues with legacy approaches. More specifically, the present disclosure provides a detailed description of techniques used in systems, methods, and in computer program products for adaptive determination of dynamically-composited web elements using a collaboration rulebase. The disclosed embodiments modify and improve over legacy approaches by teaching technical solutions that address technical problems attendant to computer-based user interfaces. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical fields pertaining to usability of computer-based user interfaces as well as advances in various technical fields related to web-based collaboration.

In one aspect, a method commences upon identifying a server in a cloud-based environment, wherein the server is interfaced with one or more storage devices that store one or more objects accessible by two or more users. Upon receiving a request to access an object that is stored in the cloud-based environment, the method processes the request to determine if the object has two or more rendering options such as a popup rendering option or a modal rendering option. If so, the method selects one of the rendering options and collects further information such as user profile information and/or a collaboration rulebase, which further information is used to drive adaptive composition of the formatted object. The adaptively-formatted object transferred over the network in satisfaction of the request.

Further details of aspects, objectives, and advantages of the technological embodiments are described herein in the following descriptions, drawings, and claims

BRIEF DESCRIPTION OF THE DRAWINGS

The drawings described below are for illustration purposes only. The drawings are not intended to limit the scope of the present disclosure.

DETAILED DESCRIPTION

Overview

Figure 1A:
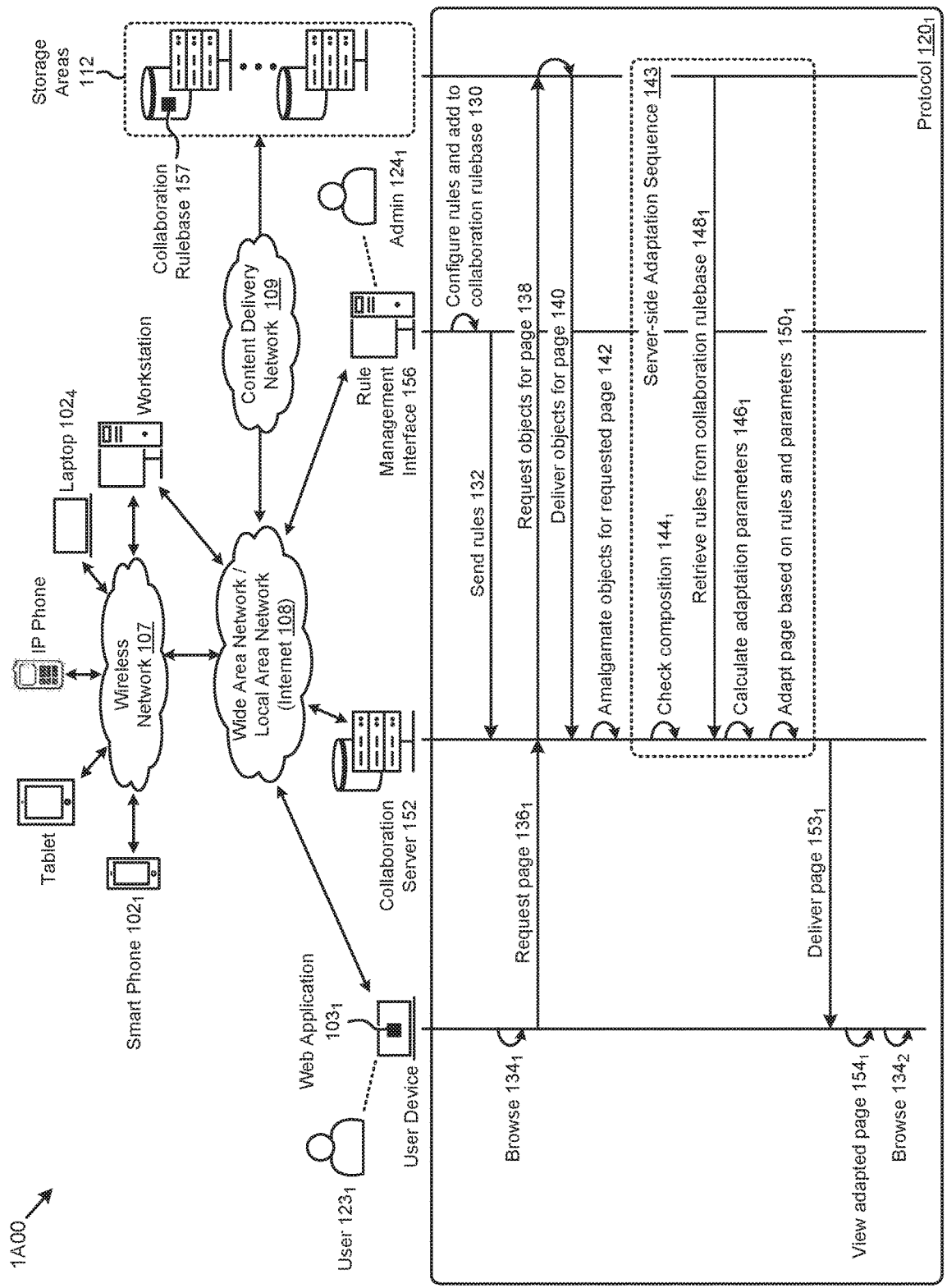
FIG. 1A exemplifies a collaboration environment having computing components that interact to perform server-side adaptive determination of dynamically-composited web elements using a collaboration rulebase, according to some embodiments.

Modal windows or popup windows can be used in a user interface. Popup windows come up during rendering as a new window that can be managed like other windows. In some cases this is desirable however, in other cases, especially when there are many popups, popup windows can be difficult to manage (e.g., they can hide behind another window and can be easily missed, or inadvertently dismissed). Modals on the other hand can ameliorate some of the detractions of popups. Moreover, modals tend to be less distracting, at least due to the aspect of modals that makes the underlying web page inactive (e.g., not available for user interaction) while the modal is active. Strictly as an example, some modals darken the background (e.g., darkening the parent web page) in order to reduce visual distractions—an aspect that sometimes facilitates user focus on the content in the modal. Modal windows are sometimes preferred over pop-ups since a user could have ad blocking software installed on their browser that might block popup windows. Another possibility beyond popups or modals is to present an additional HTML page that would not be blocked by popup or ad blocker software, and to present the additional page at the appropriate moment and location on the rendering surface.

Unfortunately the determination of which technique to use (e.g., popup, modal or additional HTML page) cannot always be known at the time the web application designer is laying out a page or flow. In some cases, the determination is made on the basis of user-terminal characteristics. In other cases, the determination is made on the basis of individual user preferences that are stored on a server or on the user's terminal or both. Techniques are needed to adaptively layout or composite the web page or pages (or popup or modal) on the basis of information that is known right at the time of rendering. Moreover, techniques are needed to adaptively layout or composite the web page or pages (or popup or modal) on the basis of a set of preferences or collaboration rules in combination with information that is known right at the moment of rendering.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A exemplifies a collaboration environment 1A00 having computing components that interact to perform server-side adaptive determination of dynamically-composited web elements using a collaboration rulebase.

FIG. 1A depicts a protocol for handling dynamically-composited web elements in a cloud-based collaboration environment. The group of messages and operations shown as server-side adaptation sequence 143 includes a portion of a protocol to adapt a web page based on rules (see operation $150_1$).

As shown, operation of protocol $120_1$ commences when an administrator collaborator $124_1$ interacts with a rule management interface 156 to configure rules, then add the rules to one or more storage areas 112 (see operation 130). The rules can be stored in a database or a table or a file or any other storage area that is accessible to a collaboration server 152. In some situations the rules are pushed to the collaboration server (see message 132). In other situations, the collaboration server can retrieve rules from a storage area (e.g., from a collaboration rulebase 157).

At some moment, a user collaborator $123_1$ interacts with a user device (e.g., a laptop $102_4$) and browses (e.g., see operation $134_1$) or otherwise interacts with a web page or web application $103_1$. During such interactions, the user device requests a page from the collaboration server 152. Content corresponding to the page request can be satisfied wholly by the collaboration server, and/or the request can be satisfied in part by using content (e.g., shared objects) stored or formed at the collaboration server and in part by using content (e.g., shared objects) retrieved from the storage areas (e.g., see message 138 and message 140). The content for the requested page is amalgamated in preparation for layout (see operation 142).

Server-Side Page Adaptation

As shown, the protocol enters into a server-side adaptation sequence. Aspects of the page to be composited are identified (e.g., see operation $144_1$), and such aspects are considered for their impact to the layout of the page to be delivered. Rules from a rulebase are retrieved (see message $148_1$) and characteristics of the requesting device are determined (e.g., see operation $146_1$) and considered with respect to any applicable rules from the rule base (e.g., to composite the page using a popup or not). For example, if the requesting device has a large screen (e.g., as on a laptop), a rule from the rulebase might fire so as to choose a layout involving a second page (e.g., in addition to the requested page) rather than a popup. On the other hand, if the requesting device has a small screen (e.g., as on a smart phone $102_1$), a rule from the rulebase might fire so as to choose to adapt the composition of the page in a manner that involves a popup rather than a second page (see operation $150_1$). In another situation, if the requesting device has a large screen (e.g., as on a laptop), a rule from the rulebase might fire so as to choose a layout involving a modal. On the other hand, if the requesting device has a small screen (e.g., as on a smart phone $102_1$), a rule from the rulebase might fire so as to choose to adapt the composition of the page in a manner that involves a second page (i.e. in addition to the requested page) rather than a modal (see operation $150_1$).

The foregoing is merely one example, and many other situations can be considered when compositing a page. Many operations and tests can be performed so as to calculate adaptation parameters (see operation $146_1$) and to adapt the page based on applicability of the rules to the adaptation parameters (see operation $150_1$). Many scenarios involving page adaptation based on adaptation parameters and a rulebase are discussed infra. The adapted page is delivered (see message $153_1$) and the user collaborator $123_1$ views the adapted page (see operation $154_1$) and/or continues to browse (see operation $134_2$).

In some cases, the page or pages to be delivered comprise a workspace that is managed by a collaboration server so as to facilitate sharing (e.g., shared viewing, shared editing, etc.) of objects. In a sharing or collaborating situation, aspects of sharing (e.g., presenting pages and objects in a consistent manner between collaborators 118) might be tagged with a higher priority in the rulebase than the aforementioned device size oriented rules. Such a scenario is shown and described as pertaining to FIG. 1B.

Figure 1B:
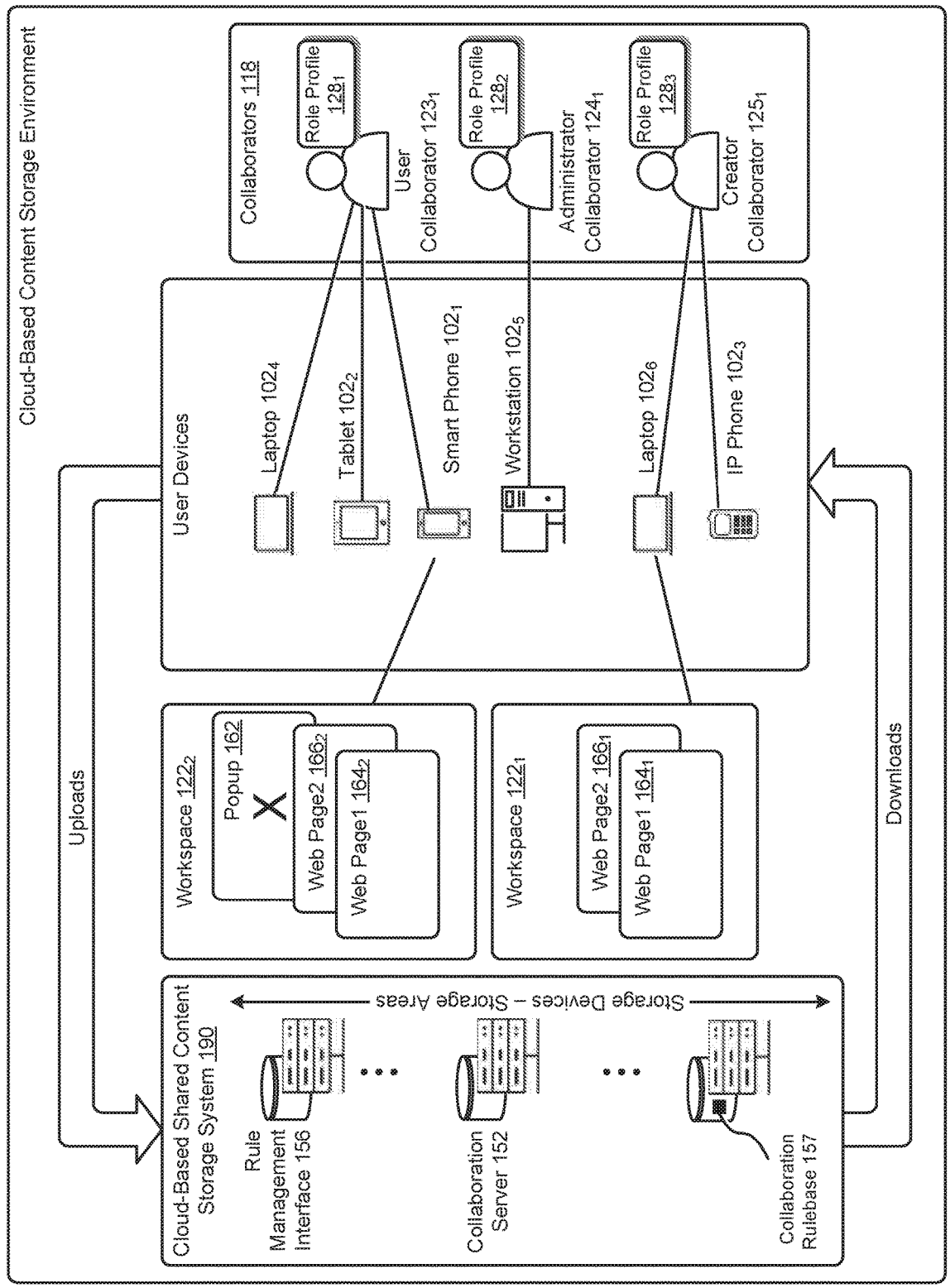
FIG. 1B exemplifies multiple collaborators interacting with instances of collaboration workspaces served from a cloud-based content storage system, according to an embodiment.

FIG. 1B exemplifies multiple collaborators interacting with instances of collaboration workspaces served within a cloud-based shared content storage environment. As an option, one or more variations of collaboration workspaces or any aspect thereof may be implemented in the context of the architecture and functionality of the embodiments described herein.

FIG. 1B depicts a situation where a collaboration-oriented rule overrides a device-oriented rule. As shown, a creator collaborator $125_1$ has a role profile $128_3$ that identifies the creator collaborator and the creator collaborator's role (e.g., as a creator collaborator). The depiction also shows a user collaborator $123_1$ having a role profile $128_1$ that identifies the user collaborator and the user collaborator's role. The depiction further shows an administrator collaborator $124_1$ having a role profile $128_2$ that identifies the administrator collaborator and the administrator collaborator's role. In this example, the creator collaborator accesses a workspace $122_1$ from a laptop device (e.g., laptop $102_6$). Referring again to the server-side adaptation sequence 143, the collaboration server might retrieve rules from the collaboration rulebase and composite the page. In some cases, two or more rules might fire (e.g., the conditions to apply the rule are present), yet there is some conflict or priority to be resolved or observed before determining the manner by which to adapt the page for delivery to the workspace. Strictly as one example, two rules might be present in the rulebase.

RuleA: If the user device from which the page is requested is a smart phone (e.g., smart phone $102_1$), then composite the pages using a popup.

RuleB: If a creator collaborator (e.g., creator collaborator $125_1$) has set preferences for created objects, then observe the creator collaborator's preferences when compositing the page—regardless of the role of the requesting user.

In this case the conflict arises because RuleA applies to the workspace $122_2$ (which is accessed from a user device that is a smart phone), and also RuleB applies to workspace $122_2$ since RuleB is set to observe the creator collaborator's preferences when compositing the page for the requesting user. Such conflicts can be resolved in many ways. In this example, the conflict is resolved by applying a set of prioritization rules when a conflict arises. The prioritization rule from among the set of prioritization rules that fires in this case is a prioritization rule that provides an override to a creator collaborator.

As shown, the workspace $122_1$ of the creator collaborator $125_1$ is populated in accordance with RuleB. In the example shown, the creator collaborator's preferences indicate a preference for web pages rather than popups, and thus, workspace $122_2$ is populated with Web Page1 $164_1$, and web page2 $166_1$. The workspace $122_2$ is accessed from a user device that is shown as the smart phone $102_1$, and thus RuleA applies. However, since RuleA and RuleB are in conflict, the conflict is resolved using a hierarchy of composition rules. In this case, the administrator collaborator's RuleB overrides RuleA, and thus the workspace $122_2$ that was originally set to become populated with web page1 $164_2$ and popup 162 is instead populated with web page1 $164_2$ and web page2 $166_2$. As shown, popup 162 is overridden by the operation of the rule conflict resolution.

A hierarchy of composition rules and conflict resolution rules can be used to codify a regime that a creator collaborator can control or exert influence over the presentation of collaborator-created materials. There are other situations where conflict is resolved using different priorities. Strictly as one example, if the user device is a wearable device (e.g., a smart watch) it might not be technically feasible to observe the creator collaborator preferences. An administrator collaborator $124_1$ might enter or assist in entering rules into the rulebase that handle specific situations. The range of situations is wide. The situations described in the discussions below (e.g., see FIG. 2A) are merely examples.

The techniques heretofore discussed are described as pertaining to the server-side adaptation sequence 143. However, any of the aforementioned operations and protocols for determination of dynamically-composited web elements using a collaboration rulebase can be performed in whole or in part on a client. The following FIG. 1C discusses one particular embodiment where a client-side adaptation sequence 145 is carried out.

Figure 1C:
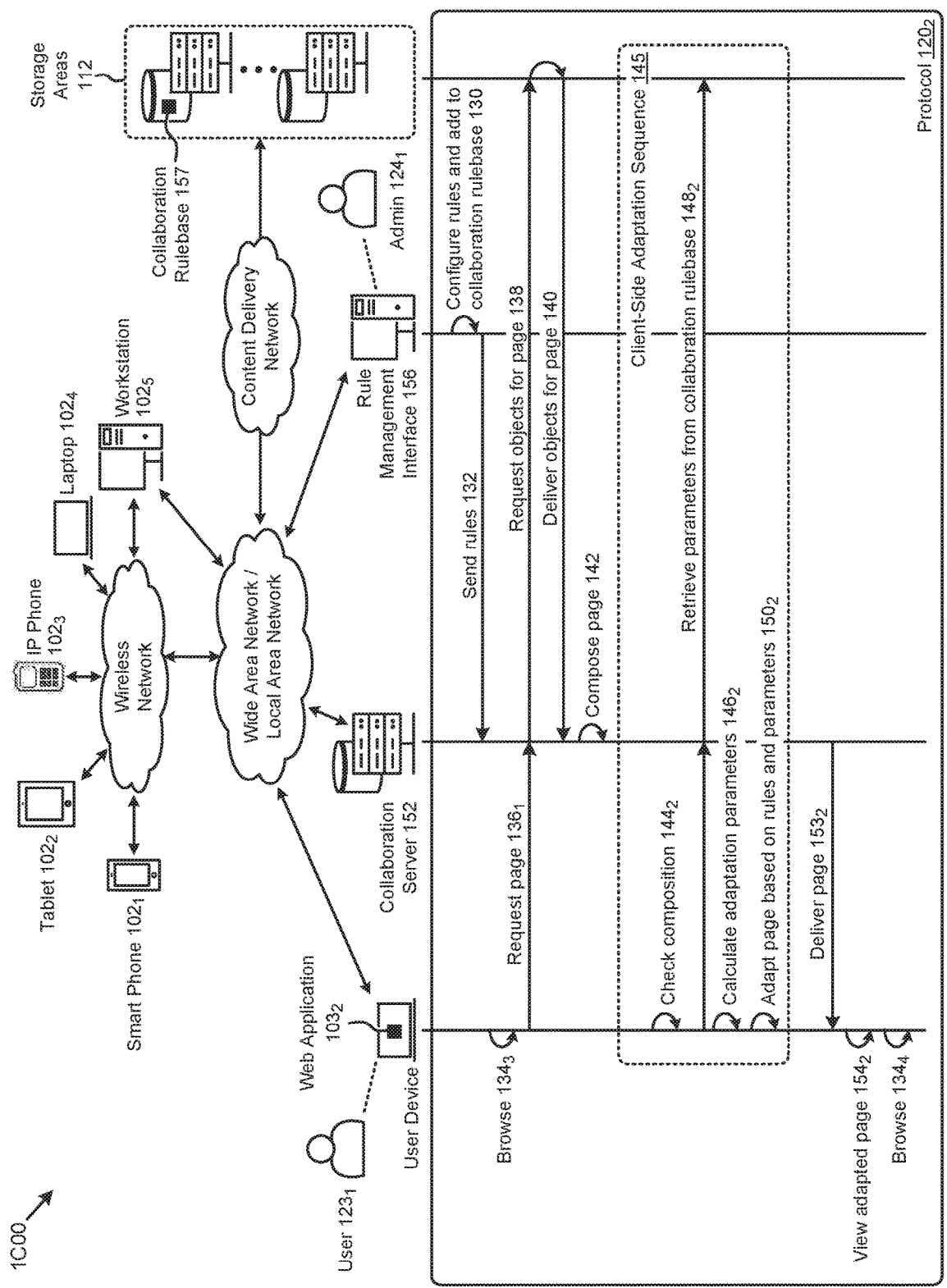
FIG. 1C exemplifies a collaboration environment having computing components that interact to perform client-side adaptive determination of dynamically-composited web elements using a collaboration rulebase, according to some embodiments.

FIG. 1C exemplifies a collaboration environment 1C00 having computing components that interact to perform client-side adaptive determination of dynamically-composited web elements using a collaboration rulebase. As an option, one or more variations of collaboration environment 1C00 or any aspect thereof may be implemented in the context of the architecture and functionality of the embodiments described herein. Also, the collaboration environment 1C00 or any aspect thereof may be implemented in any environment.

As shown, operation of protocol $120_2$ commences when an administrator collaborator $124_1$ interacts with a rule management interface 156 to configure rules, then add the rules to one or more storage areas 112 (see operation 130).

At some moment, a user collaborator $123_1$ interacts with a user device (e.g., a laptop $102_4$) and browses (e.g., see operation $134_3$) or otherwise interacts with a web page or web application $103_2$. During such interactions, the user device requests a page (see message $136_1$) from the collaboration server 152. Content corresponding to the page request can be satisfied wholly by the collaboration server, and/or the request can be satisfied in part by using content (e.g., shared objects) stored or formed at the collaboration server and in part by using content (e.g., shared objects) retrieved from the storage areas (e.g., see message 138 and message 140). The content for the requested page is amalgamated in preparation for layout (see operation 142).

Client-Side Page Adaptation

As shown, the protocol enters into a client-side adaptation sequence 145. On the client, aspects of the page to be composited are identified (e.g., see operation $144_2$), and such aspects are considered for their impact to the layout of the page to be delivered. Rules from a rulebase are retrieved (see message $148_2$) and characteristics of the requesting device are determined (e.g., see operation $146_2$) and considered with respect to any applicable rules from the rule base (e.g., to composite the page using a popup or not). For example, if the requesting device has a large screen (e.g., as on a laptop), a rule from the rulebase might fire so as to choose a layout involving a second page (e.g., in addition to the requested page) rather than a popup. On the other hand, if the requesting device has a small screen (e.g., as on a smart phone $102_1$), a rule from the rulebase might fire so as to choose to adapt the composition of the page in a manner that involves a popup rather than a second page (see operation $150_2$).

Many scenarios involving page adaptation based on adaptation parameters and a rulebase can be addressed using operations within client-side adaptation sequences, possibly in cooperation with operations performed within server-side adaptation sequences. The adapted page is delivered (see message $153_2$) and the user collaborator $123_1$ views the adapted page (see operation $154_2$) and/or continues to browse (see operation $134_4$).

The aforementioned group of operations and messages that are depicted in protocol $120_1$ or in protocol $120_2$ can be repeated any number of times as the user interacts with the application. In certain environments, and as shown in FIG. 1C, the ecosystem comprises various computing systems (e.g., servers and devices) interconnected by a wireless network 107, a network 108, and a content delivery network 109. The wireless network 107, the network 108, and the content delivery network 109 can comprise any combination of a wide area network (e.g., WAN), local area network (e.g., LAN), cellular network, wireless LAN (e.g., WLAN), or any such means for enabling communication of computing systems. The wireless network 107, the network 108, and the content delivery network 109 can also collectively be referred to as the Internet. The content delivery network 109 can comprise any combination of a public network and a private network.

The collaboration environment 1A00 and collaboration environment 1C00 may further comprise instances of user devices that can represent one of a variety of other computing devices (e.g., a tablet $102_2$, an IP phone $102_3$, a workstation $102_5$, etc.) having software (e.g., a client application, etc.) and hardware (e.g., a graphics processing unit, display, monitor, etc.) capable of processing and displaying information (e.g., web page, graphical user interface, etc.) on a display.

As aforementioned, many scenarios involving page adaptation based on adaptation parameters and a rulebase can be addressed using operations within client-side adaptation sequences, possibly in cooperation with operations performed within server-side adaptation sequences. Some of such client-server cooperation scenarios are shown and discussed as pertaining to FIG. 2A and FIG. 2B.

Figure 2A:
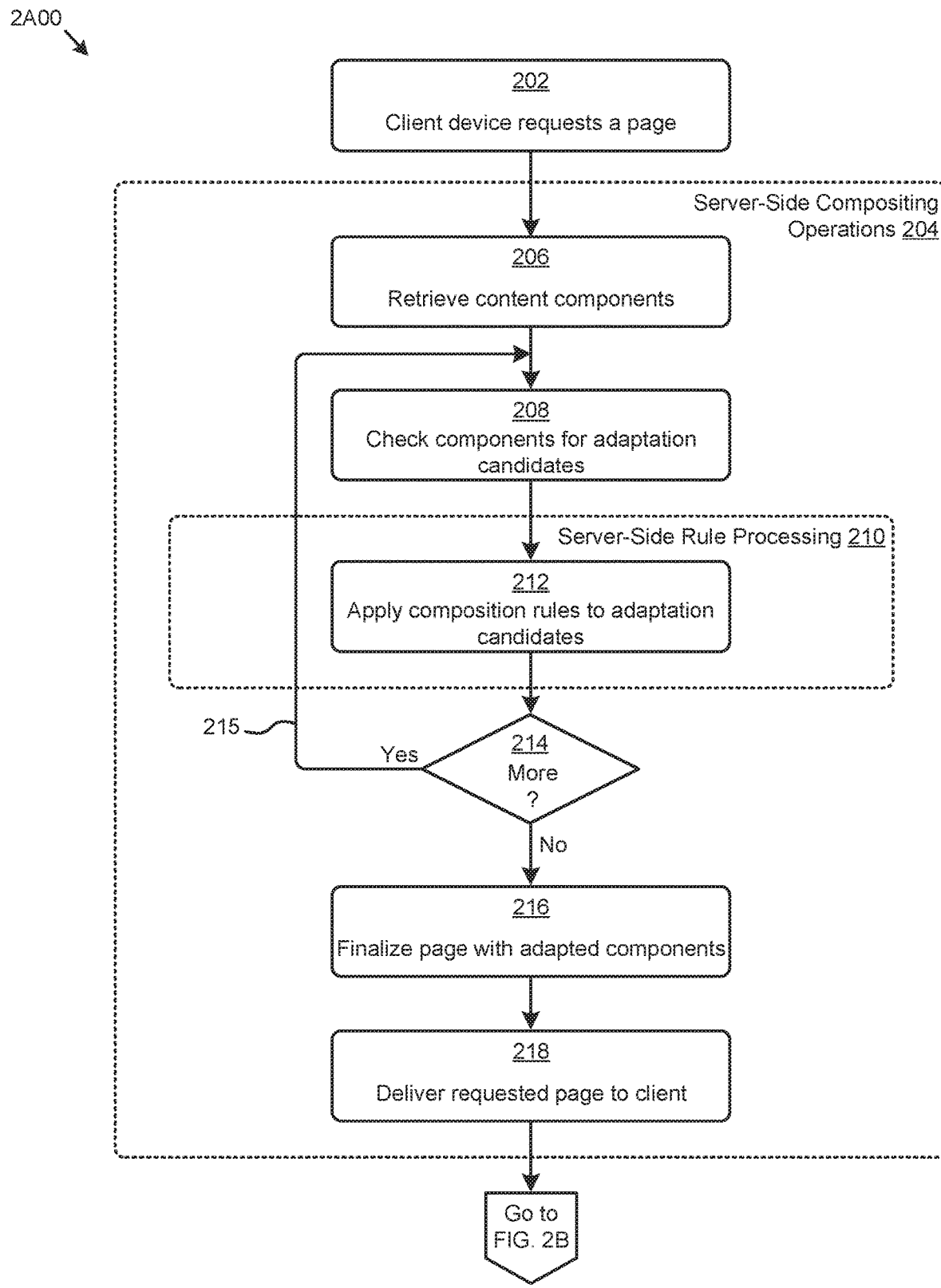
FIG. 2A and FIG. 2B depict client-server flows that perform adaptive determination of dynamically-composited web elements using a collaboration rulebase, according to an embodiment.
Figure 2B:
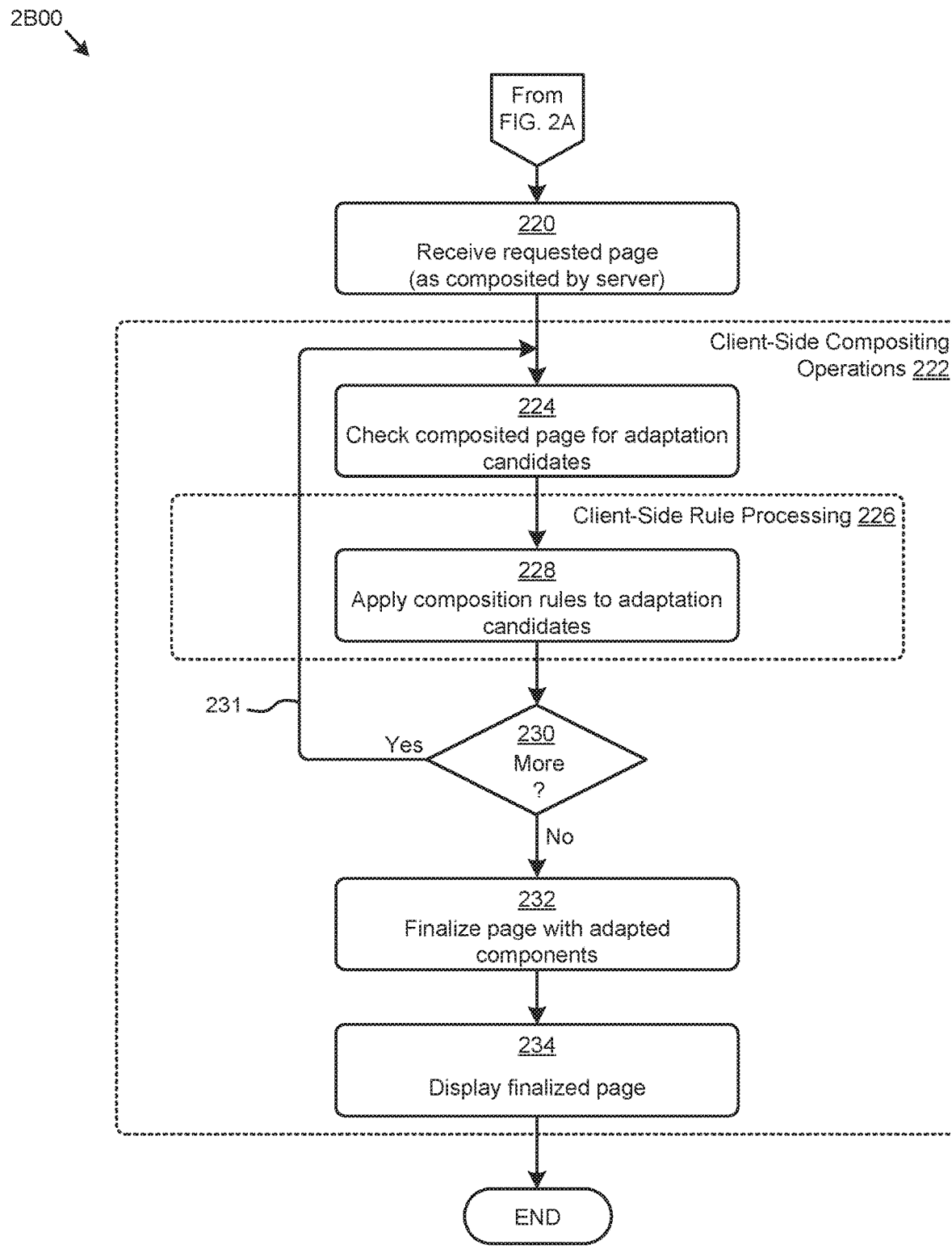

FIG. 2A and FIG. 2B depict a first portion of a client-server flow 2A00 and a second portion of a client-server flow 2B00 that perform adaptive determination of dynamically-composited web elements using a collaboration rulebase. As an option, one or more variations of the flow or any aspect thereof may be implemented in the context of the architecture and functionality of the embodiments described herein. Also, the client-server flows or any aspect thereof may be implemented in any environment.

Embodiments of the flow commence when a client device requests a page (see step 202). As shown, a sequence of next steps is performed on the server (see server-side composting operations 204). Processing can include retrieving content (see step 206), which may include retrieval of components from a content delivery network 109. Aspects of the content or components of a provisionally-composited page are checked for pertinence to adaptation rules (see step 208) and a set of adaptation candidates (e.g., candidate components or candidate objects) is formed. The rules from the rulebase are applied (see server-side rule processing 210) to the adaptation candidates (see step 212). There may be a plurality of components, some of which are deemed to be adaptation candidates, and some of which are deemed not to be adaptation candidates. A test for additional components to be considered is performed (see decision 214) and if there are more, then loop 215 is traversed. When all of the components have been considered with respect to the rulebase, then processing continues by finalizing the page with the adapted components (see operation 216) and the page can be delivered to the requestor (see step 218). In some cases it is more convenient to form a set of adaptation candidates on the client. In such cases, server-side adaptation operations include instructions (e.g., scripts, such as JavaScript) within the requested page, and the client processes the embedded scripts upon receipt or thereafter.

FIG. 2B shows receipt, by the client requestor, of the requested page as was composited by the server (see step 220). A processing sequence is entered (e.g., see client-side compositing operations 222). The client (e.g., using scripts as provided by the server) can perform client-side checks on aspects of the composited the page to identify pertinence to adaptation rules (see step 224), and a set of adaptation candidates (e.g., candidate components or candidate objects) is formed. The rules from collaboration rulebase 157 are applied (see client-side rule processing 226) to the adaptation candidates (see step 228). There may be a plurality of components, some of which are deemed to be adaptation candidates, and some of which are deemed not to be adaptation candidates. A test for additional components to be considered is performed (see decision 230) and if there are more, then loop 231 is traversed. When all of the components have been considered with respect to the rulebase, then processing continues by finalizing the page with the adapted components (see operation 232), and the page can be displayed by the requestor (see step 234.

Figure 3A:
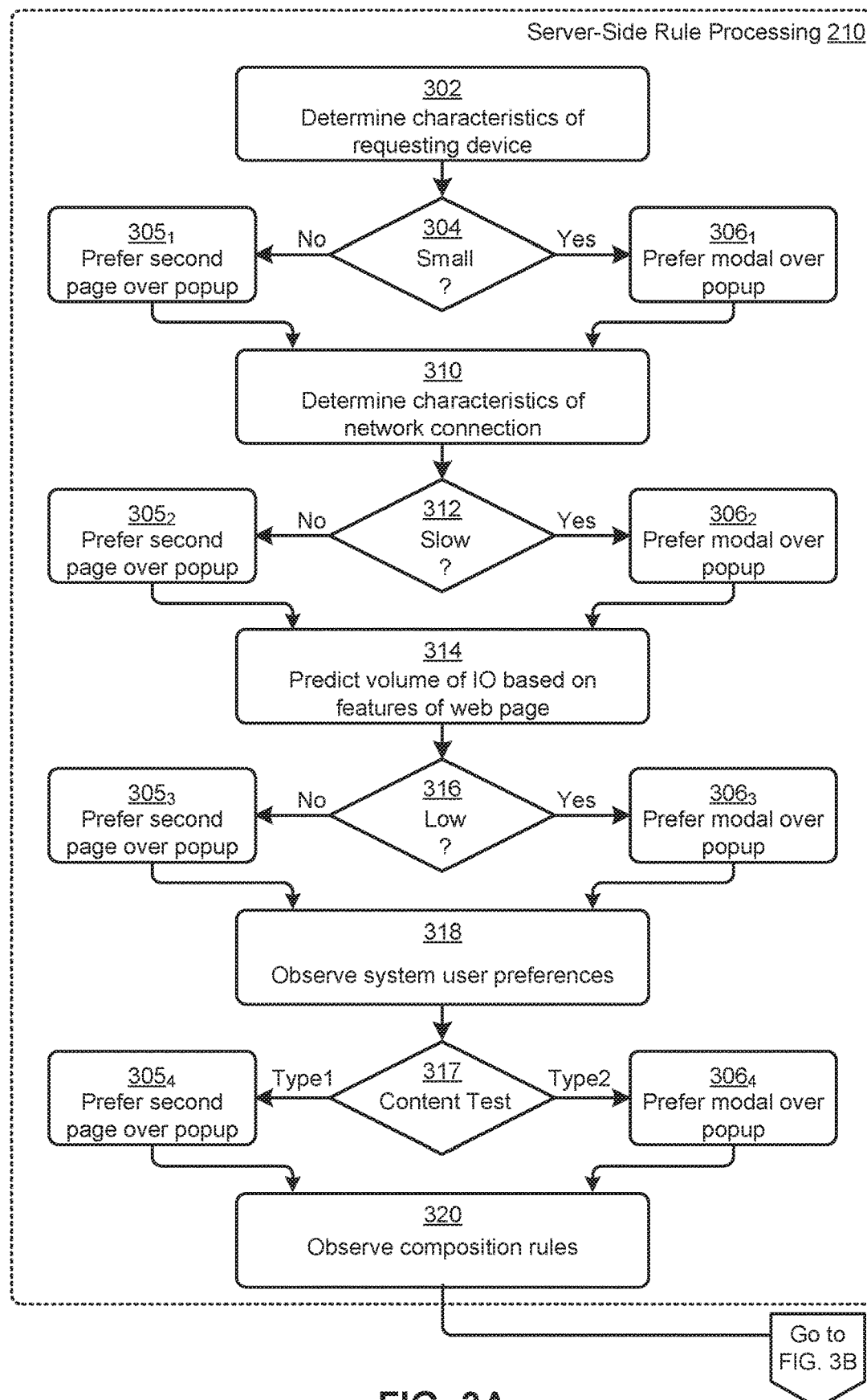
FIG. 3A and FIG. 3B depict rule processing variations used to implement adaptive determination of dynamically-composited web elements using a collaboration rulebase, according to an embodiment.
Figure 3B:
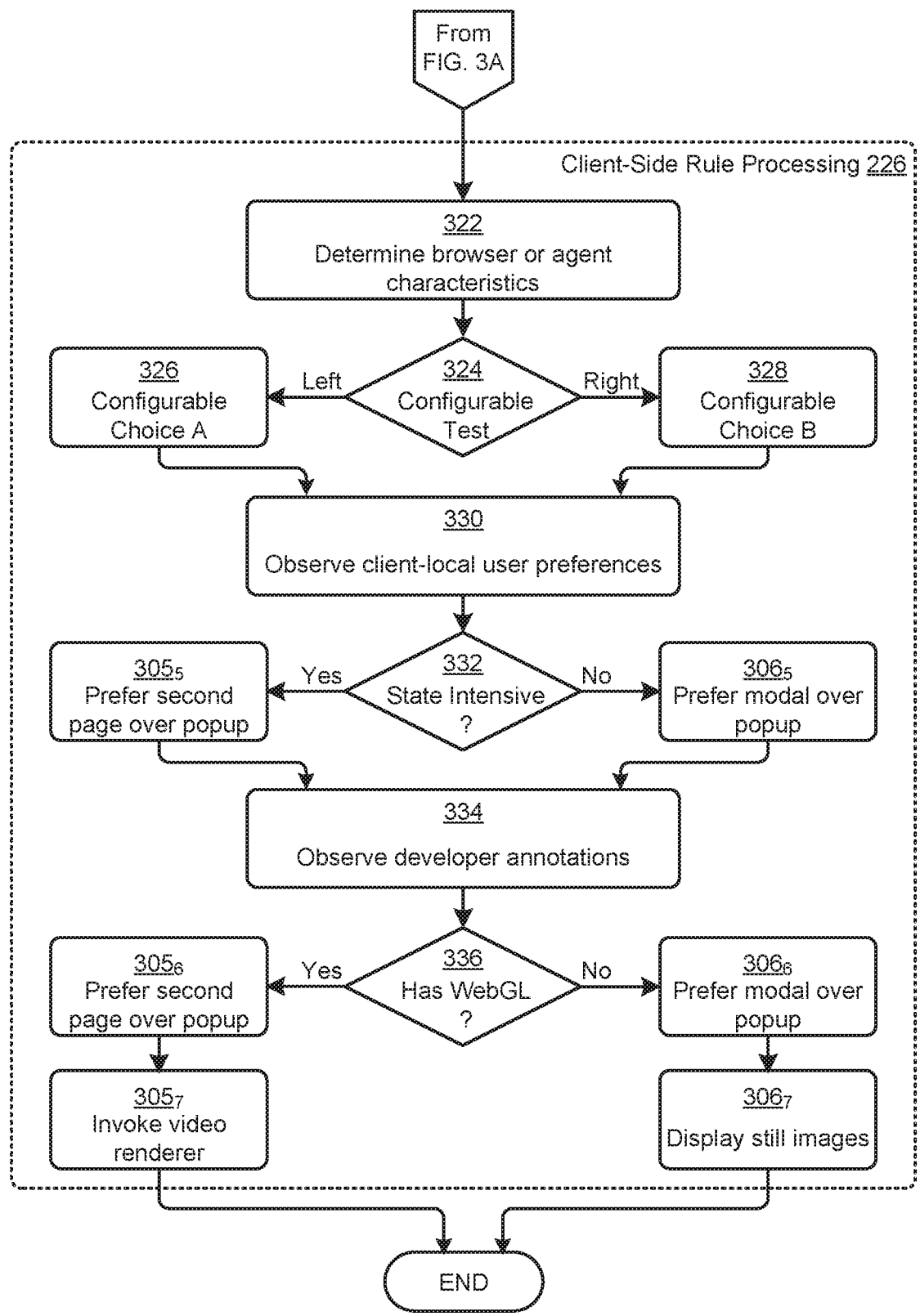

FIG. 3A and FIG. 3B depict rule processing variations used to implement adaptive determination of dynamically-composited web elements using a collaboration rulebase. As an option, one or more variations of rule processing variations or any aspect thereof may be implemented in the context of the architecture and functionality of the embodiments described herein. Also, the rule processing variations or any aspect thereof may be implemented in any environment.

The server-side rule processing 210 of FIG. 3A is merely one embodiment of server-side rule processing. In this example, rules are provided in the form of YES/NO tests. One logic branch (e.g., a YES branch) or another logic branch (e.g., a NO branch) is taken based on the result of the YES/NO test(s).

The shown server-side rule processing 210 commences upon determination of characteristics of the requesting device (see step 302). If the device is deemed to be "small" (see decision 304) then the YES branch is taken and the result of the rule application is to prefer use of a modal over use of a popup (see step $306_1$). If the NO branch is taken, then the rule application is to prefer use of a second page over use of a popup (see step $305_1$). In some situations, and as shown, there may be many such YES/NO tests, and a progression through a series of YES/NO tests may add quantitative values to preferences. Such individual or amalgamated preference values can be included in an overall preference determination.

Additional processing might include further YES/NO tests. In some situations the characteristics of the communication network between the server and client can relate to or influence overall preferences (see step 310). For example if the network is deemed to be slow (see decision 312), then the rule application is to prefer use of a modal over use of a popup (see step $306_2$). Otherwise, if the network is not deemed to be slow, then the rule application is to prefer use of a second page over use of a popup (see step $305_2$). Continuing, some situations invoke the prediction or determination of characteristics (e.g., component size, component type, nature of user interaction, etc.) of the page to be displayed (e.g., see step 314). For example, if the volume of IO at the client is deemed to be low (see decision 316), then the rule application is to prefer use of a modal over use of a popup (see step $306_3$). Otherwise, the rule application is to prefer use of a second page over use of a popup (see step $305_3$). As another example, if the content test (see test 317) determines that the content is of a "Type1" then prefer a second page over use of a popup (see step $305_4$) or, if the content test (see test 317) determines that the content is of a "Type2" then prefer use of a modal over use of a popup (see step $306_4$). The content type text can include aspects of the size of the content (e.g., large number of bytes, small number of bytes, etc.), and/or can include aspects of the nature or origination or progression of the content being tested. For example, the content may have been originated by a user having a particular role (e.g., user role), and the content test may determine "Type1" or "Type2" (see test 317) based in part on the role. Or, the content may have a particular history, such as a data item that has been viewed by a particular set of other users. In some situations, a preference or bias may be pre-entered either explicitly, or as a result of an association with a role. In still other situations, the aforementioned preference or bias may not be known or calculated or otherwise determined until some number of occurrences serves to train a model. Such a model can be seeded with preference values that are a priori determined (e.g., estimated, or supposed preferences), which seeded preference values can be weighted more (or less) as the number of uses or occurrences continues to increase, and the number of tests and branches taken continues to increase. The model can be instrumented such that in situ behavior can be monitored. Analysis of the monitored behaviors can, in some cases, result in better seeds.

Further details regarding general approaches to instrumentation and monitoring are described in U.S. application Ser. No. 14/938,720, titled "DYNAMIC GENERATION OF INSTRUMENTATION LOCATORS FROM A DOCUMENT OBJECT MODEL" filed on Nov. 11, 2015, which is hereby incorporated by reference in its entirety.

There may be many still further YES/NO tests, and a progression through a series of YES/NO tests may add quantitative values to preferences. Determined preference values can be included in an overall preference determination, which in turn can be used in rule-firing and other decision-making during composition (see step 320).

The shown client-side rule processing 226 of FIG. 3B is merely one embodiment of client-side rule processing. In this example, client-side rule processing 226 commences upon determination of characteristics of the browser or web agent of the requesting device (see step 322). The decision that is taken as a result of the foregoing processing can be a configurable test. Moreover, the actions taken as a result of executing the configurable test can be a configurable choice (e.g., see step 326), and the configurable test can have two or more alternative branches (e.g., see step 328).

In some cases, and as shown, user preferences can be used as inputs to a test. A user might be given an option to set a user preference for a skill level. For example, a user might set "SkillLevel"="Novice" and another user, or the same user at a different time, might set "SkillLevel"="Expert". In the circumstance that the user interface varies in some way as being responsive to the user's "SkillLevel" preference setting, then a configurable test (see decision 324) that considers the complexity or state intensity of one or another preferred user interface can be taken. In this example, if the then-current user preferences (see operation 330) are set to a setting that is deemed to be state intensive (see the YES branch of decision 332) then the rule application is to prefer use of a second page over use of a popup (see step $305_5$), otherwise the result of the rule application is to prefer use of a modal over use of a popup (see step $306_5$).

Still further, a partial determination or quantified bias for one choice or another choice can be made based in part on developer annotations (see step 334). For example, a web page developer might strongly prefer use of a modal or second page over a popup. The developer can annotate the markup so as to indicate specific actions to take (e.g., by the server-side rule processing 210 and/or by the client-side rule processing 226). As one specific example, and as shown, if the developer annotations (e.g., DISPLAY="3D") are deemed to indicate a display-intensive nature of the intended rendering, and if the client display has WebGL (or another graphics accelerator API) then a path to a preferred use of a second page over use of a popup (see step $305_6$) is taken, and a video renderer is invoked (see step $305_7$). If, on the other hand, the developer annotations are deemed to indicate a display-intensive nature of the intended rendering, and if the client display does not have WebGL (or another graphics accelerator API) then a path to a preferred use of a modal over use of a popup (see step $306_6$) is taken, and one or more still images are displayed (see step $306_7$).

The foregoing examples depict merely a selection of aspects of web page components or aspects of layout or delivery of web pages. Additional aspects can be considered, and processing rules can be described in rules within the rule base. Strictly as some examples, rules can be defined to address composition of user interface elements based on (1) then-current folder settings of the requesting user; (2) a user's client device characteristics; (3) a user's client browser or web agent characteristics (e.g., scripts enabled, popups enabled, etc.); (4) the size and/or nature of content within the web page; (5) the intensity of interaction with the candidate page or object; (6) whether or not information from one composited page would affect another page; (7) user history; (8) system or network history; (9) anti-virus software running on the requesting device; and/or (10) an optimization function. Any of the aforementioned rules or aspects of rules can be used singly or in combination with other rules.

Figure 4:
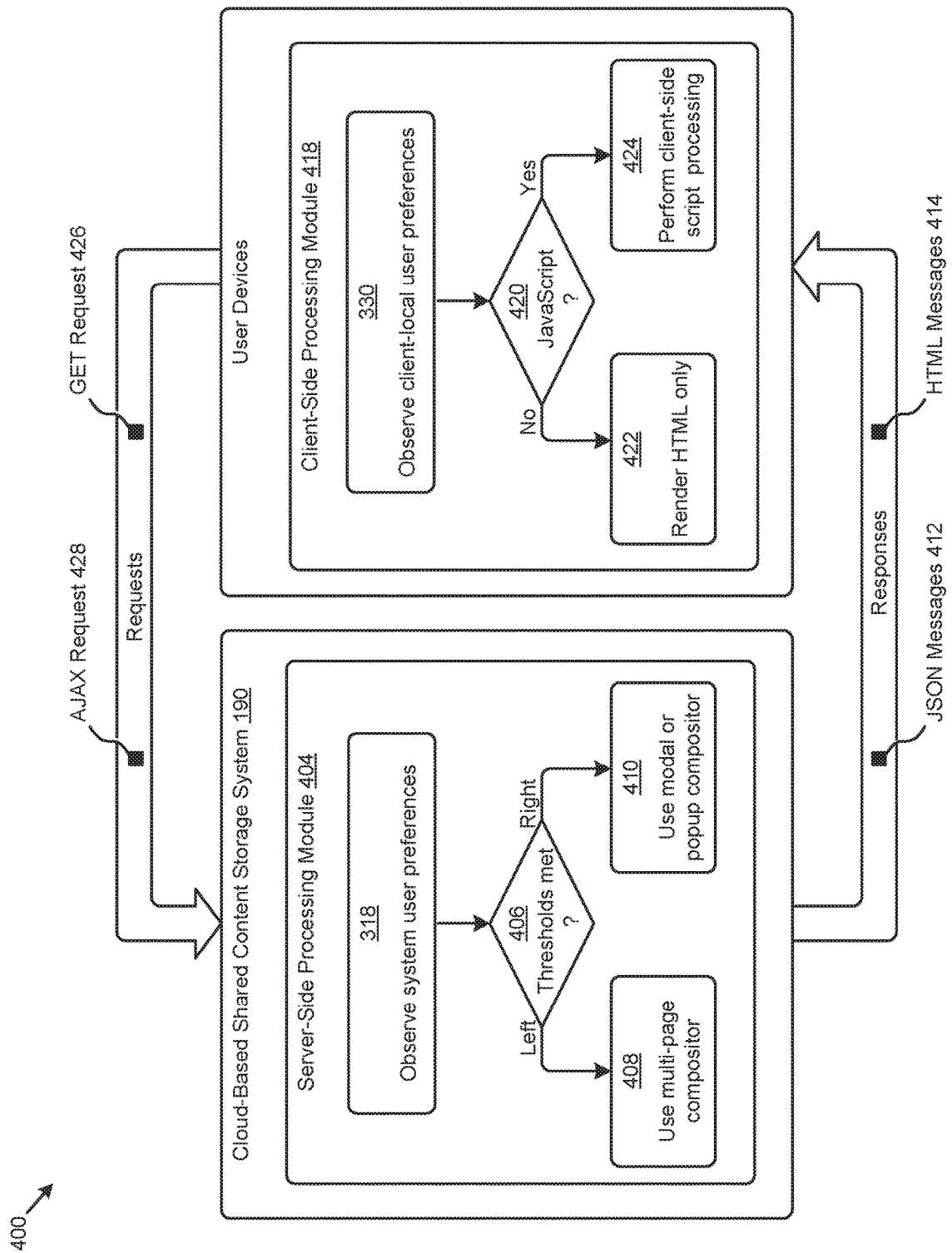
FIG. 4 depicts a request-response protocol used between computing platforms to perform adaptive determination of dynamically-composited web elements using a collaboration rulebase.

FIG. 4 depicts a request-response protocol 400 used between computing platforms to perform adaptive determination of dynamically-composited web elements using a collaboration rulebase. As an option, one or more variations of request-response protocol 400 or any aspect thereof may be implemented in the context of the architecture and functionality of the embodiments described herein. Also, the request-response protocol 400 or any aspect thereof may be implemented in any environment.

The embodiment of the request-response protocol 400 shown in FIG. 4 includes transmission of network packets in the form of requests (e.g., AJAX requests 428, GET requests 426), and includes transmission of network packets in the form of responses (JSON messages 412 or HTML messages 414). In the embodiment, one or more user devices include a client-side processing module 418 that communicates with a cloud-based shared content storage system 190. As shown the cloud-based shared content storage system 190 includes a server-side processing module 404, and the user devices include a client-side processing module 418. Both the server-side processing module 404 and the client-side processing module 418 implement a set of default behaviors based on preferences. For example, the server-side processing module 404 can exhibit a default behavior to select between a multi-page compositor (e.g., see step 408) or a modal or popup compositor (e.g., see step 410) based on a determination of some minimum set or threshold value(s) determined from user preferences (see decision 406). For example, if the user preferences indicate a preference for use of modals over multi-page rendering, and if there were no extant situations that would override such a user preference, then the right branch would be taken. If on the other hand, there are extant situations (e.g., developer annotations) that would override such a user preference (e.g., availability of a high-performance video renderer), then the left branch would be taken.

For the client, the client-side processing module 418 can implement a set of default behaviors. For example, the client-side processing module 418 can exhibit a default behavior to limit rendering to HTML rendering only (e.g., see step 422) or perform client-side processing (e.g., see step 424) based on a determination of user preferences to enable JavaScript or not (see decision 420).

Figure 5:
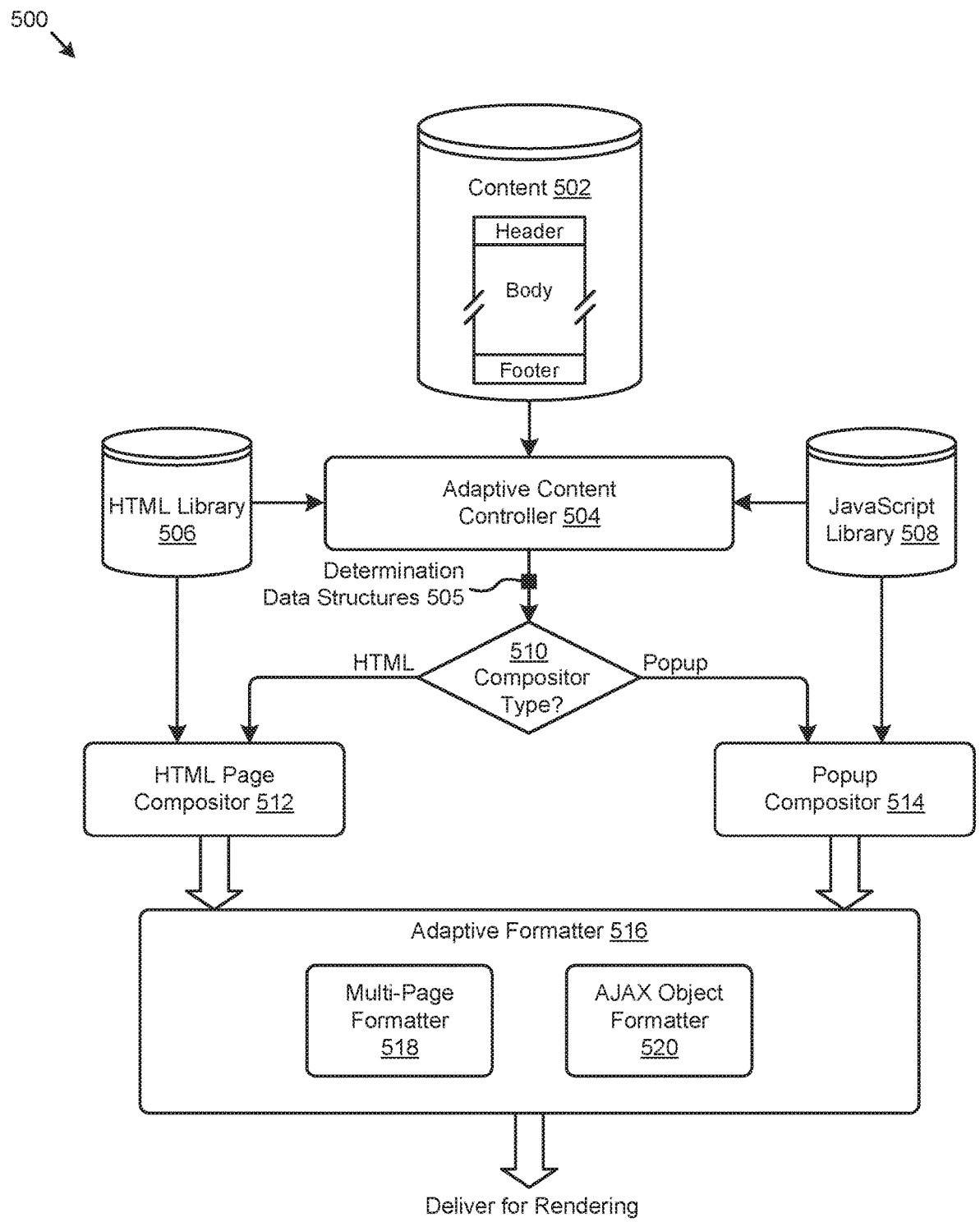
FIG. 5 depicts a composition subsystem used to determine a layout of dynamically-composited web elements using a collaboration rulebase, according to an embodiment.

FIG. 5 depicts a composition subsystem 500 used to determine a layout of dynamically-composited web elements using a collaboration rulebase. As an option, one or more variations of composition subsystem 500 or any aspect thereof may be implemented in the context of the architecture and functionality of the embodiments described herein. Also, the composition subsystem 500 or any aspect thereof may be implemented in any environment.

The embodiment shown in FIG. 5 includes a stored instance of content 502 that includes templates having a header portion, a body portion, and a footer portion. An adaptive content controller 504 can access templates from content 502 as well as HTML components from an HTML library 506 and scripts from a JavaScript library 508. Further, the adaptive content controller 504 can receive any of the data, or messages, or determinations or test results as have been heretofore disclosed. Based on such inputs, the adaptive content controller 504 can provide determination data structures 505 to a conditional operation that makes a decision (e.g., see decision 510) to use a page compositor or to use a popup compositor. The determination data structures can be bit fields, or built-in data types, or composites, or class objects (e.g., Java class objects). A determination can have alternative branches (e.g., an HTML branch and a Popup branch, as shown). In some sets of circumstances or under some sets of conditions, the HTML branch is taken and the HTML compositor 512 is invoked. In other situations or under other conditions, the Popup branch is taken and a popup compositor 514 is invoked. In either case (e.g., whether the HTML compositor 512 is invoked or whether the popup compositor 514 is invoked), the shown adaptive formatter 516 serves to adaptively format the content for delivery to the requesting device. The adaptive formatter can select between one format or another (e.g., see multi-page formatter 518 and see AJAX object formatter 520), and/or the adaptive formatter can perform adaptively based on any test, such as the tests of FIG. 3A and FIG. 3B. As is discussed heretofore, the composition of the web page to be delivered is performed after application of the rules in the collaboration rulebase. Either or both of the shown multi-page formatter 518 and/or the AJAX object formatter 520 can be used in conjunction with steps to effect delivery for rendering.

Additional Embodiments of the Disclosure

Additional Practical Application Examples

Figure 6A:
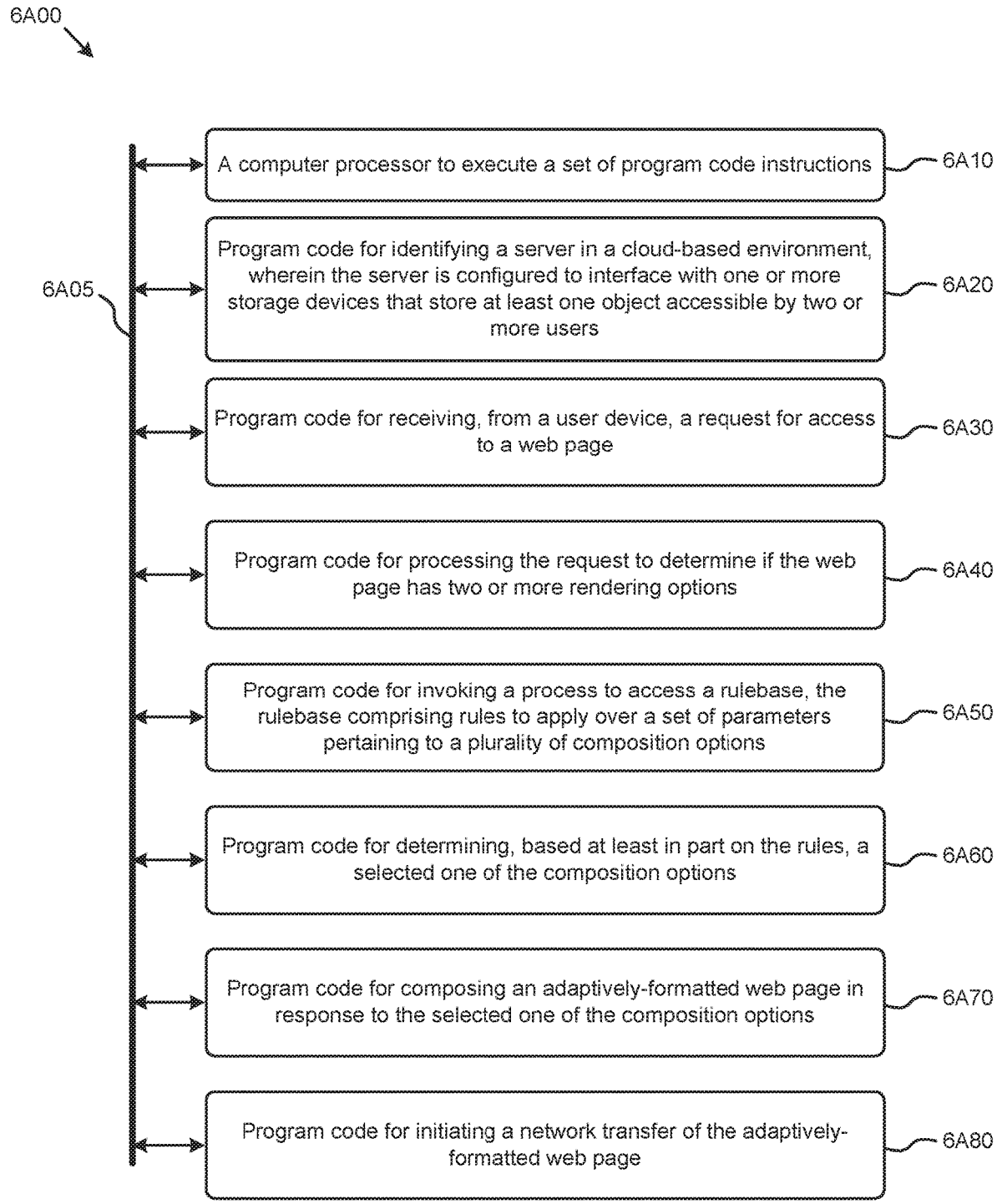
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system.

As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising a computer processor to execute a set of program code instructions (see module 6A10) and modules for accessing memory to hold program code instructions to perform: identifying a server in a cloud-based environment, wherein the server is configured to interface with one or more storage devices that store at least one object accessible by two or more users (see module 6A20); receiving, from a user device, a request for access to a web page (see module 6A30); processing the request to determine if the web page has two or more rendering options (see module 6A40); invoking a process to access a rulebase, the rulebase comprising rules to apply over a set of parameters pertaining to a plurality of composition options (see module 6A50); determining, based at least in part on the rules, a selected one of the composition options (see module 6A60); composing an adaptively-formatted web page in response to the selected one of the composition options (see module 6A70); and initiating a network transfer of the adaptively-formatted web page (see module 6A80).

In some cases the rendering options comprise a web page option, a popup option, or a modal option. The rules to apply might be organized into groups, such as server-side rules (e.g., requesting device rules, network characteristic rules, IO volume rules, user preference rules, conflict resolution rules, etc.) or such as client-side rules (e.g., configurable test rules, state loss rules, developer annotation rules, etc.).

The formatting can be carried out such that adaptively-formatted web pages use content for web pages or popups or modals that include JSON-formatted content, and/or HTML content, or any combinations thereof. The adaptively-formatted objects can be output from a content management system (CMS) and/or any system or subsystem that generates dynamically-composited objects (e.g., web pages or popups or modals, or graphic objects, etc.).

Figure 6B:
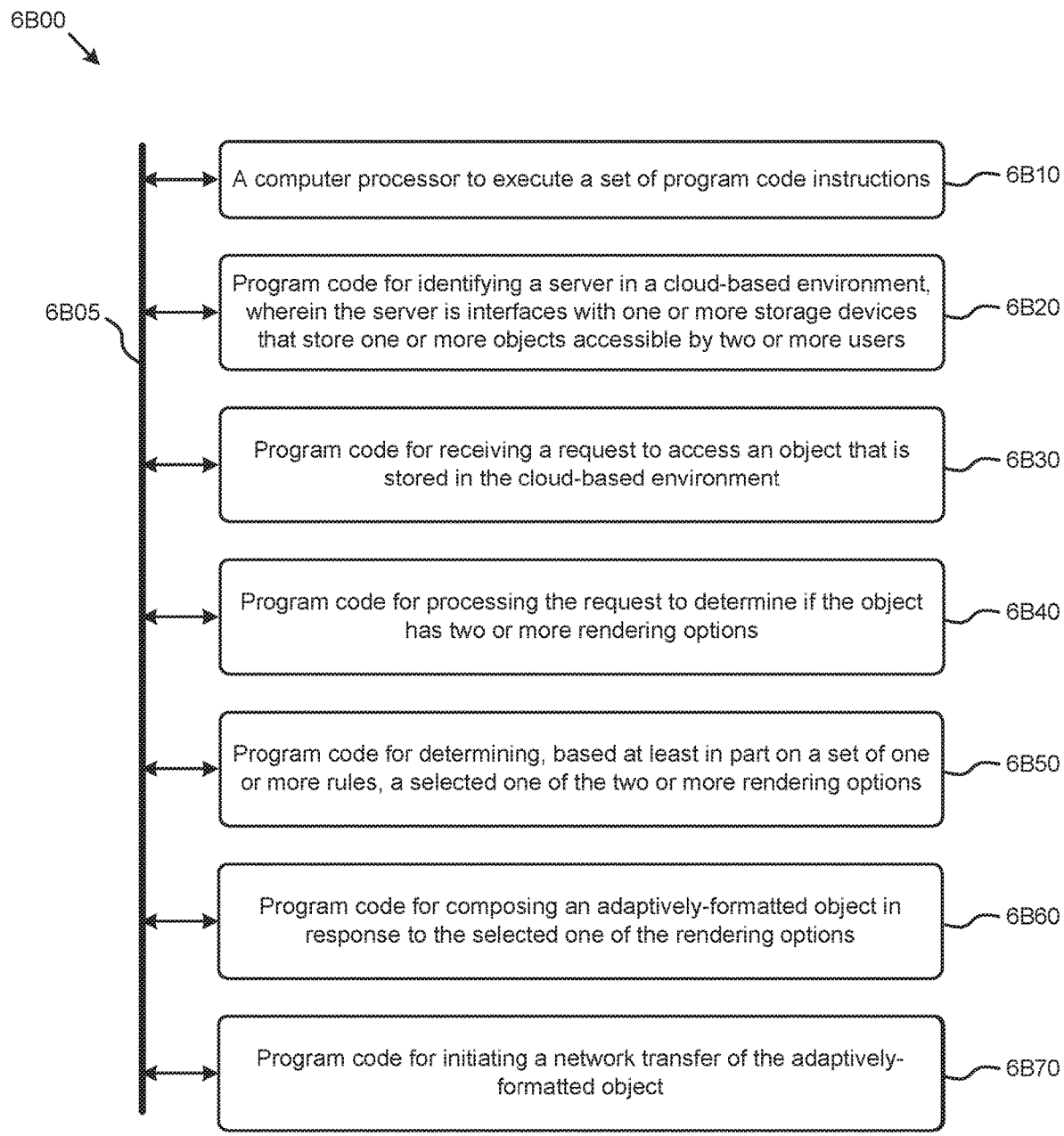

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising a computer processor to execute a set of program code instructions (see module 6B10) and modules for accessing memory to hold program code instructions to perform: identifying a server in a cloud-based environment, wherein the server interfaces with one or more storage devices that store one or more objects accessible by two or more users (see module 6B20); receiving a request to access an object that is stored in the cloud-based environment (see module 6B30); processing the request to determine if the object has two or more rendering options (see module 6B40); determining, based at least in part on a set of one or more rules, a selected one of the two or more rendering options (see module 6B50); composing an adaptively-formatted object in response to the selected one of the rendering options (see module 6B60); and initiating a network transfer of the adaptively-formatted object (see module 6B70).

The foregoing is merely one example, and other variations are possible. Strictly as a description of one embodiment in one environment, steps can include variations of:

receiving a request to access a web page;
delivering the web page to a browser, wherein the web page comprises a markup language reference to an object that can be invoked from the web page;
receiving, from the browser, a request to invoke the object;
processing the request to determine if the object has two or more rendering options;
determining, in response to the request, a selected one of the two or more rendering options;
composing an adaptively-formatted object in response to the selected one of the rendering options; and
initiating a network transfer of the adaptively-formatted object.

The steps can be carried out on various hardware environments in various system architectures.

System Architecture Overview

Additional System Architecture Examples

Figure 7A:
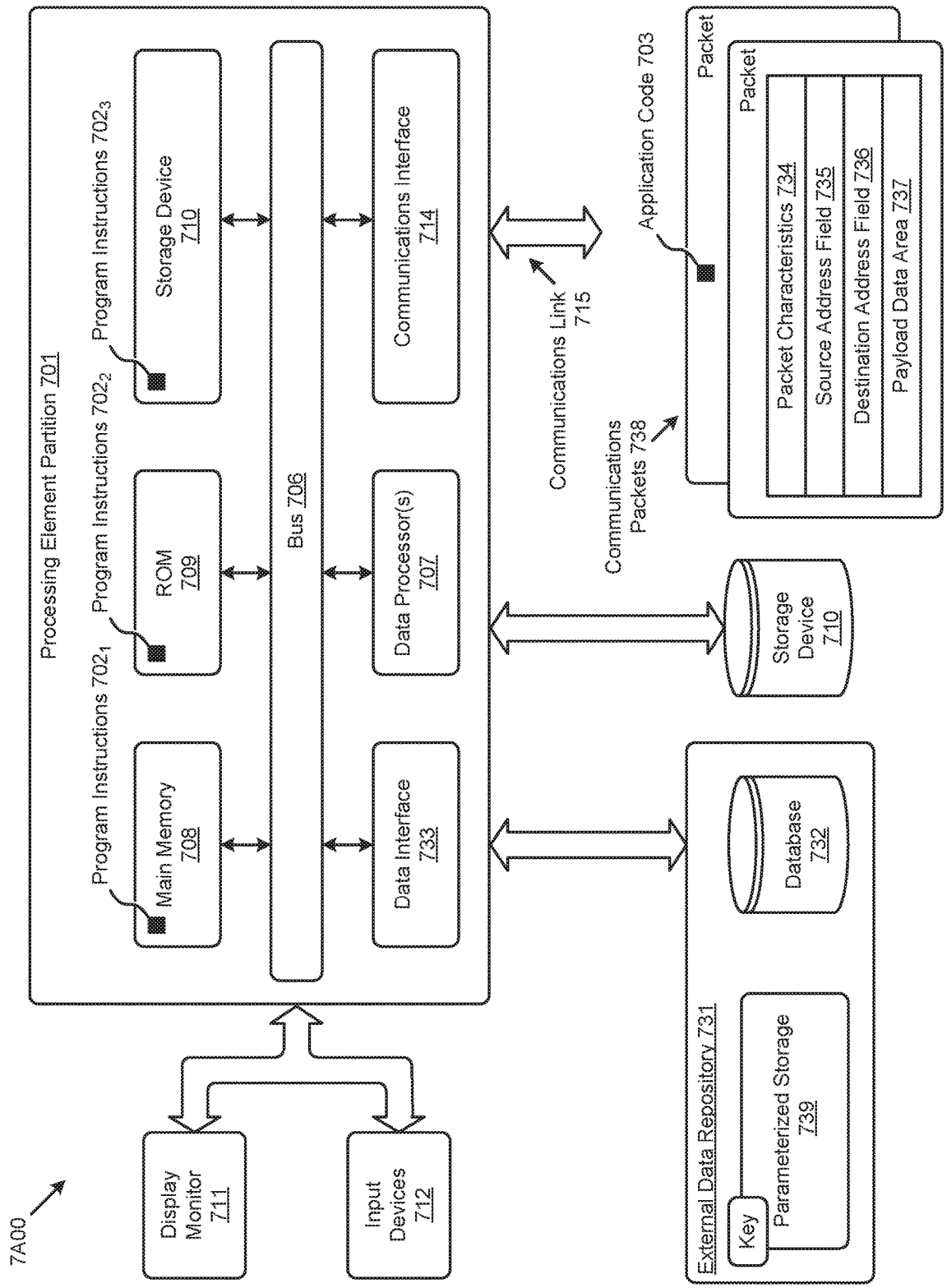
FIG. 7A and FIG. 7B depict exemplary architectures of components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal or external storage device 710 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets 738 comprising any organization of data items. The data items can comprise a payload data area 737, a destination address 736 (e.g., a destination IP address), a source address 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 7A00. According to certain embodiments of the disclosure, two or more instances of computer system 7A00 coupled by a communications link 715 (e.g., LAN, PTSN, or wireless network) may perform the sequence of instructions required to practice embodiments of the disclosure using two or more instances of components of computer system 7A00.

The computer system 7A00 may transmit and receive messages such as data and/or instructions organized into a data structure (e.g., communications packets 738). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the operational and/or performance characteristics of using adaptive determination of dynamically-composited web elements in a collaboration setting.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of adaptive determination of dynamically-composited web elements using a collaboration rulebase). Such files or records can be brought into and/or stored in volatile or non-volatile memory.

Figure 7B:
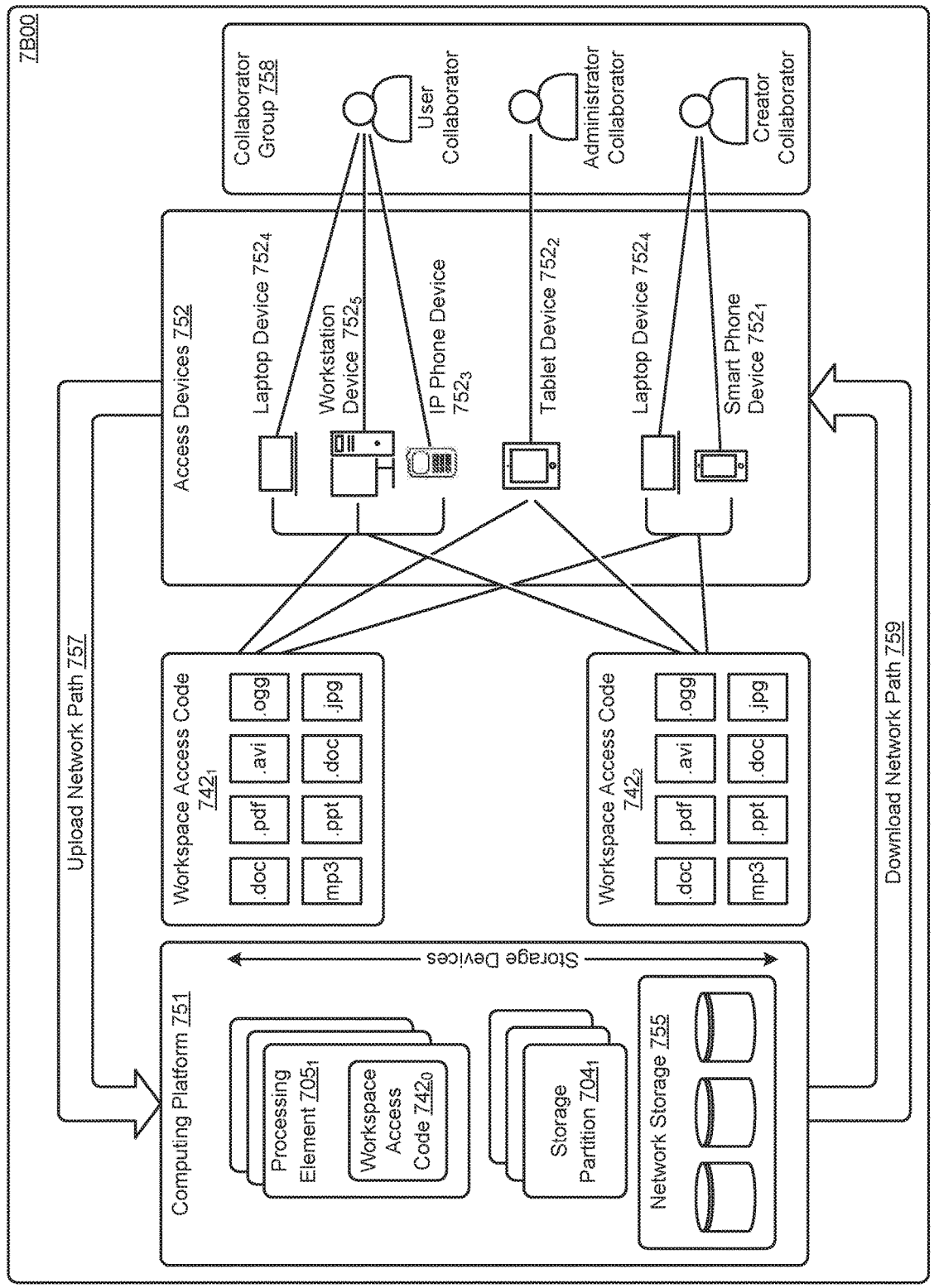

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$) Workspace access code can be executed on any of the shown access devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such the shown networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   maintaining a server in a cloud-based environment, wherein the server stores an object accessible by two or more user devices, the object having two or more rendering options to be selected based at least in part on a characteristic of a requesting user device, wherein the two or more rendering options comprise at least two of a web page option, a popup option, or a modal option to display the object;
   receiving a request to access the object from a user device of the two or more user devices;
   selecting one of the two or more rendering options, wherein the selection is based at least in part on applying a set of rules, the set of rules comprising a first rule that renders the object based at least in part on the characteristic of the user device, and a second rule that renders the object for the two or more user devices to collaborate on the object; and
   composing an adaptively-formatted object corresponding to the object in response to the selected one of the rendering options for the user device.

2. The method of claim 1, wherein the selected one of the rendering options renders the object in a same way for the user device and a second user device requesting access to the object, the second user device being a different type of user device having a different characteristic than the user device, wherein the object is rendered in the same way using at least one of a web page option, a popup option, or a modal option to display the object in the same way for the user device and the second user device for collaborating on the object.

3. The method of claim 1, wherein composing the adaptively-formatted object is performed by the server.

4. The method of claim 3, wherein an adaptive formatter using a multi-page formatter formats the adaptively-formatted object.

5. The method of claim 1, wherein composing the adaptively-formatted object is performed by the user device and a second user device.

6. The method of claim 1, wherein the adaptively-formatted object is composed using a popup compositor.

7. The method of claim 1, wherein selecting the one of the two or more rendering options uses a prioritization rule to resolve conflicting rules between the first rule and the second rule.

8. The method of claim 1, wherein the characteristic is a screen size of the requesting user device.

9. A computer program product, embodied in a non-transitory computer readable medium, the non-transitory computer readable medium having stored thereon a sequence of instructions which, when stored in memory and executed by a processor, causes the processor to perform a set of acts, the set of acts comprising:
   maintaining a server in a cloud-based environment, wherein the server stores an object accessible by two or more user devices, the object having two or more rendering options to be selected based at least in part on a characteristic of a requesting user device, wherein the two or more rendering options comprise at least two of a web page option, a popup option, or a modal option to display the object;
   receiving a request to access the object from a user device of the two or more user devices;
   selecting one of the two or more rendering options for the user device, wherein the selection is based at least in part on applying a set of rules, the set of rules comprising a first rule that renders the object based at least in part on the characteristic of the user device, and a second rule that renders the object for the two or more user devices to collaborate on the object; and
   composing an adaptively-formatted object corresponding to the object in response to the selected one of the rendering options for the user device.

10. The computer program product of claim 9, wherein the selected one of the rendering options renders the object in a same way for the user device and a second user device requesting access to the object, the second user device being a different type of user device having a different characteristic than the user device, wherein the object is rendered in the same way using at least one of a web page option, a popup option, or a modal option to display the object in the same way for the user device and the second user device for collaborating on the object.

11. The computer program product of claim 9, wherein composing the adaptively-formatted object is performed by the server.

12. The computer program product of claim 11, wherein an adaptive formatter using a multi-page formatter formats the adaptively-formatted object.

13. The computer program product of claim 9, wherein composing the adaptively-formatted object is performed by the user device and a second user device.

14. The computer program product of claim 9, wherein the adaptively-formatted object is composed using a popup compositor.

15. The computer program product of claim 9, wherein selecting the one of the two or more rendering options uses a prioritization rule to resolve conflicting rules between the first rule and the second rule.

16. The computer program product of claim 9, wherein the characteristic is a screen size of the requesting user device.

17. A system comprising:
a server device in a cloud-based environment, wherein the server device stores an object accessible by two or more user devices, the object having two or more rendering options to be selected based at least in part on a characteristic of a requesting user device, wherein the two or more rendering options comprise at least two of a web page option, a popup option, or a modal option to display the object; and
one or more server devices that perform steps of:
receiving a request to access the object from a user device of the two or more user devices,
selecting one of the two or more rendering options for the user device, wherein the selection is based at least in part on applying a set of rules, the set of rules comprising a first rule that renders the object based at least in part on the characteristic of the user device, and a second rule that renders the object for the two or more user devices to collaborate on the object, and
composing an adaptively-formatted object corresponding to the object in response to the selected one of the rendering options for the user device.

18. The system of claim 17, wherein the selected one of the rendering options renders the object in a same way for the user device and a second user device requesting access to the object, the second user device being a different type of user device having a different characteristic than the user device, wherein the object is rendered in the same way using at least one of a web page option, a popup option, or a modal option to display the object in the same way for the user device and the second user device for collaborating on the object.

19. The system of claim 17, wherein composing the adaptively-formatted object is performed by the server device.

20. The system of claim 19, wherein an adaptive formatter using a multi-page formatter formats the adaptively-formatted object.

21. The system of claim 17, wherein composing the adaptively-formatted object is performed by the user device and a second user device.

22. The system of claim 17, wherein the adaptively-formatted object is composed using a popup compositor.

23. The system of claim 17, wherein selecting the one of the two or more rendering options uses a prioritization rule to resolve conflicting rules between the first rule and the second rule.

24. The system of claim 17, wherein the characteristic is a screen size of the requesting user device.

* * * * *